US012782949B2

(12) United States Patent
Baddam et al.

(10) Patent No.: US 12,782,949 B2
(45) Date of Patent: Nov. 3, 2026

(54) MOBILE ROBOT WITH OPTIMAL CONTROL STRATEGIES UNDER SENSOR UNCERTAINTIES

(71) Applicant: Robert Bosch GmbH, Stuttgart (DE)

(72) Inventors: Sandeep Reddy Baddam, Pittsburgh, PA (US); Jonathan Francis, I, Pittsburgh, PA (US); Sirajum Munir, Pittsburgh, PA (US); Sushanta Rakshit, Milpitas, CA (US); Martin Coors, Mountain View, CA (US); Samarjit Das, Wexford, PA (US); Vivek Jain, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 18/401,254

(22) Filed: Dec. 29, 2023

(65) Prior Publication Data

US 2025/0216848 A1 Jul. 3, 2025

(51) Int. Cl.
*G05D 1/229* (2024.01)
*G05D 1/246* (2024.01)
*G05D 1/644* (2024.01)

(52) U.S. Cl.
CPC ......... *G05D 1/2295* (2024.01); *G05D 1/2464* (2024.01); *G05D 1/644* (2024.01)

(58) Field of Classification Search
None
See application file for complete search history.

(56) References Cited

U.S. PATENT DOCUMENTS 12,145,620 B1 * 11/2024 Shen ........................ H04W 4/40
2018/0116475 A1 * 5/2018 So ......................... A47L 9/2852
2021/0129868 A1 * 5/2021 Nehmadi ............ B60W 60/001
(Continued)

FOREIGN PATENT DOCUMENTS

KR 102306142 B1 * 9/2021 ...... B60W 60/00186
WO WO-2022170279 A1 * 8/2022 .............. B25J 9/162

OTHER PUBLICATIONS

KR-102306142-B1 Combined Original and Translated (Year: 2021).*
(Continued)

*Primary Examiner* — Abdhesh K Jha
*Assistant Examiner* — Elizabeth Galyn Martinez
(74) *Attorney, Agent, or Firm* — Kathy Takeguchi; Maginot, Moore & Beck LLP

(57) ABSTRACT

A computer-implemented system and method relate to a mobile robot. State data is generated using sensor data from at least one sensor. A current confident zone is identified on a unified confident zone map using the state data. The unified confident zone map includes confident zones. Each confident zone is indicative of a given confidence level of given state data of a selected sensor modality for a given location. Assessment data is generated that indicates whether the current confident zone is deemed a failure zone. The mobile robot is controlled based on a control command. The control command relates to a recovery plan of moving the mobile robot out of the current confident zone when the assessment data indicates that the current confident zone is the failure zone. The control command relates to another plan when the assessment data indicates that the current confident zone is not the failure zone.

20 Claims, 6 Drawing Sheets

(56) References Cited

U.S. PATENT DOCUMENTS

2025/0206331 A1* 6/2025 Sane ................. B60W 50/0205

OTHER PUBLICATIONS

Merged Original and Translation of WO 2022170279 A1 (Year: 2022).*

Simon,"Optimal State Estimation: Kalman, H∞, and Nonlinear Approaches," Online ISBN: 9780470045343, DOI: 10.1002/0470045345, Jan. 17, 2006.

Bar-Shalom et al., "Estimation with Applications to Tracking and Navigation: Theory, Algorithms and Software," Online ISBN: 9780471221272, DOI: 10.1002/0471221279, Jan. 4, 2002.

Maybeck et al., "Stochastic Models, Estimation, and Control, vol. I," IEEE Transactions on Systems, Man, and Cybernetics, vol. SMC-10, No. 5, May 1980, p. 282.

ChatGPT, A language model based on the GPT-3.5 architecture by OpenAI [Computer Software], 2021, https://openai.com.

Bemporad et al., "Robust Model Predictive Control: A Survey," Robustness in Identification and Control (1998), 21 pages.

Diehl et al., "Efficient Numerical Methods for Nonlinear MPC and Moving Horizon Estimation," Nonlinear Model Predictive Control, Lecture Notes in Control and Information Sciences, 2009, pp. 391-417.

Theodorou et al., "Reinforcement Learning of Motor Skills in High Dimensions: A Path Integral Approach," 2010 IEEE International Conference on Robotics and Automation (ICRA), Anchorage Convention District, May 3-8, 2010, Anchorage, Alaska, USA, pp. 2397-2403.

Williams et al., "Information Theoretic MPC for Model-Based Reinforcement Learning," 2017 IEEE International Conference on Robotics and Automation (ICRA), Singapore, May 29-Jun. 3, 2017, doi:10.1109/ICRA.2017.7989202, pp. 1714-1721.

Hart et al., "A Formal Basis for the Heuristic Determination of Minimum Cost Paths," IEEE Transactions of Systems Science and Cybernetics, vol. ssc-4, No. 2, Jul. 1968, doi: 10.1109/TSSC.1968.300136, pp. 100-107.

Stentz, "Optimal and Efficient Path Planning for Partially-Known Environments," Proceedings of the1994 IEEE International Conference on Robotics and Automation, San Diego, CA, USA, 1994, vol. 4, doi: 10.1109/ROBOT.1994.351061, pp. 3310-3317.

* cited by examiner

MOBILE ROBOT WITH OPTIMAL CONTROL STRATEGIES UNDER SENSOR UNCERTAINTIES

GOVERNMENT RIGHTS

At least one or more portions of this invention may have been made with government support under U.S. Government Contract No. 80LARC21C0013, awarded by National Aeronautics and Space Administration (NASA). The U.S. Government may therefore have certain rights in this invention.

REFERENCE TO RELATED APPLICATIONS

The present application is related to the following patent applications: U.S. patent application Ser. No. 18/401,272, filed on Dec. 29, 2023) and U.S. patent application Ser. No. 18/401,248, filed on Dec. 29, 2023), which are both incorporated by reference in their entireties herein.

TECHNICAL FIELD

This disclosure relates generally to mobile robots, and more particularly to controlling mobile robots using various sensors.

BACKGROUND

Robot motion planning is a fundamental problem in robotics that involve determining a sequence of actions or motions for a robot to navigate from its current state to a desired goal state, while avoiding obstacles and satisfying various constraints. Robot motion planning is a complex task that requires finding feasible paths that satisfy criteria such as trajectory efficiency, power efficiency, safety, and task-completion. Robot motion planning algorithms are crucial as they allow robots to operate autonomously, making them adaptable to dynamic environments and capable of performing tasks without human intervention.

In general, planning algorithms and techniques work well when the state estimation is accurate and reliable. However, when the robot is uncertain about its state, then the uncertainty poses significant challenges on planning and controls: inaccurate state estimation leads to incorrect perceptions of the robot's environment, obstacle locations, and its own position. As a result, the planned paths may be suboptimal or unsafe, leading to collisions or failures. A major contribution for state uncertainty comes from sensor measurements. These uncertainties can arise due to noise, biases, calibration errors, or limitations in the sensing capabilities.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes receiving sensor data from one or more sensors. The method includes generating state data using the sensor data. The state data includes a position estimate of the mobile robot with respect to a target location. The method includes identifying a current confident zone on a unified confident zone map using the state data. The unified confident zone map includes a number of confident zones. Each confident zone is indicative of a given confidence level of given state data of a selected sensor modality for a given location. The method includes generating assessment data indicating whether or not the current confident zone is deemed a failure zone using predetermined criteria. The method includes generating a control command using the unified confident zone map. The method includes controlling the mobile robot based on the control command. The control command relates to a recovery plan of moving the mobile robot out of the current confident zone and to another confident zone with another confidence level when the assessment data indicates that the current confident zone is the failure zone. The another confidence level is greater than a current confidence level of the current confidence zone. The control command relates to another plan when the assessment data indicates that the current confident zone is not the failure zone.

According to at least one aspect, a system includes one or more processors and one or more memory. The one or more memory are in data communication with the one or more processors. The one or more memory include computer readable data stored thereon. The computer readable data include instructions that, when executed by the one or more processors, perform a method. The method includes generating state data using the sensor data. The state data includes a position estimate of the mobile robot with respect to a target location. The method includes identifying a current confident zone on a unified confident zone map using the state data. The unified confident zone map includes a number of confident zones. Each confident zone is indicative of a given confidence level of given state data of a selected sensor modality for a given location. The method includes generating assessment data indicating whether or not the current confident zone is deemed a failure zone using predetermined criteria. The method includes generating a control command using the unified confident zone map. The method includes controlling the mobile robot based on the control command. The control command relates to a recovery plan of moving the mobile robot out of the current confident zone and to another confident zone with another confidence level when the assessment data indicates that the current confident zone is the failure zone. The another confidence level is greater than a current confidence level of the current confidence zone. The control command relates to another plan when the assessment data indicates that the current confident zone is not the failure zone.

According to at least one aspect, one or more non-transitory computer-readable media have computer readable data stored thereon. The computer readable data includes instructions that, when executed by one or more processors, cause the one or more processors to perform a method. The method includes generating state data using the sensor data. The state data includes a position estimate of the mobile robot with respect to a target location. The method includes identifying a current confident zone on a unified confident zone map using the state data. The unified confident zone map includes a number of confident zones. Each confident zone is indicative of a given confidence level of given state data of a selected sensor modality for a given location. The method includes generating assessment data indicating whether or not the current confident zone is deemed a failure zone using predetermined criteria. The method includes generating a control command using the unified confident zone map. The method includes controlling the mobile robot based on the control command. The control command relates to a recovery plan of moving the mobile robot out of the current confident zone and to another confident zone with another confidence level when the assessment data indicates that the current confident zone is the failure zone. The another confidence level is greater than a current confidence level of the current confidence zone. The control command relates to another plan when the assessment data indicates that the current confident zone is not the failure zone.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
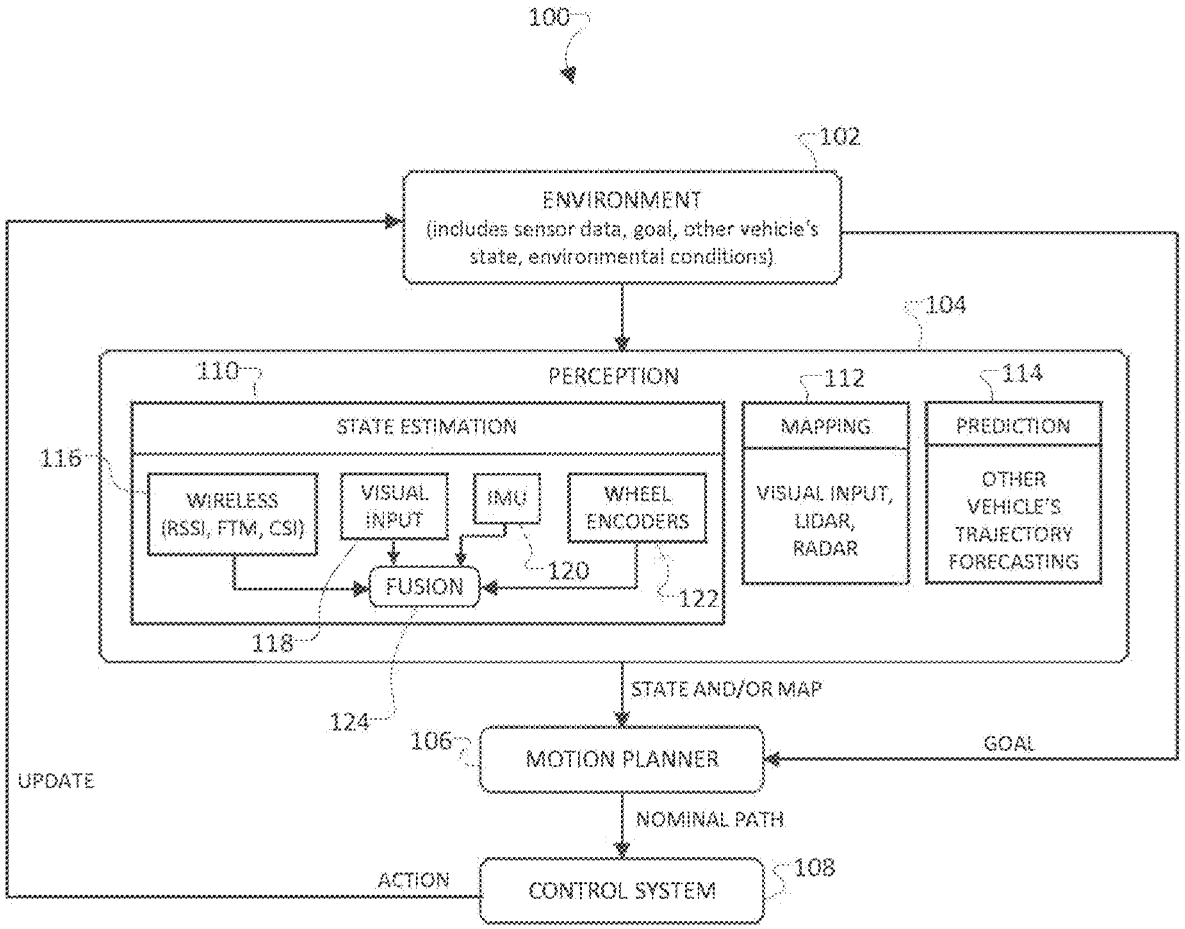
FIG. 1 is a flow diagram of an example of a process of a system according to an example embodiment of this disclosure.

FIG. 1 is a diagram that illustrates an example of a flow of information of the system 100 according to an example embodiment. As an overview, the system 100 is configured to provide an optimal control policy that accounts for inaccuracies in sensor measurements due to noise, biases, calibration errors, limitations in the sensing capabilities, etc. In addition, the system 100 is configured to perform robust control of the mobile robot at least by obtaining sensor confident zones, shaping the planner cost function, and defining the navigation recovery mode.

As shown in FIG. 1, the system 100 includes a set of modules. For example, the system 100 includes an environment module 102, a perception module 104, a motion planner 106, and a control system 108. The system 100 may include more modules or less modules than the number of modules illustrated in FIG. 1 provided that the set of modules perform at least the same or similar functions as described herein.

The environment module 102 is configured to receive and/or obtain environment data from an environment of the mobile robot. The environment data includes sensor data obtained via one or more sensors of the mobile robot, a state of the mobile robot, a goal (e.g., reference location, target location, or docking station location) of the mobile robot, environmental conditions (e.g., weather, temperature, etc.) of the environment of the mobile robot, etc. Upon obtaining this environment data relating to a current environment of the mobile robot, the environment module 102 transmits this environment data to the perception module 104.

The perception module 104 is configured to receive environment data from the environment module 102. The perception module 104 is configured to generate perception data using the sensor data. In the example shown in FIG. 1, the perception module 104 includes a state estimation module 110, a mapping module 112, and a prediction module 114.

The state estimation module 110 is configured to perform state estimation and generate state data, which include a position estimate of the mobile robot. The state estimation module 110 includes a set of sensor modules. Each sensor module corresponds to a particular sensor modality. For example, in FIG. 1, the state estimation module 110 includes a wireless module 116, a visual input module 118, an inertial measurement unit (IMU) module 120, and a wheel encoder module 122. In addition, the state estimation module 110 includes a fusion module 124, which is configured to fuse state estimation data and/or other related data received from a number of the sensor modules.

The wireless module 116 is configured to perform state estimation using wireless features. For example, the wireless module 116 is configured to extract wireless features obtained from one or more wireless sensors and generate state data including a position estimate using one or more of these wireless features. The wireless features may include received signal strength Indicator (RSSI) data, fine tune measurement (FTM) data, channel state information (CSI) data, other wireless attributes, or any combination thereof.

The visual input module 118 includes fiducial tag-base state estimation. Fiducial tags are also known as visual markers, which are specially designed patterns or symbols placed in the environment to provide reference points for robot perception systems. These tags are typically designed to be easily detectable and distinguishable by cameras, thereby allowing robots to accurately recognize their position and orientation relative to the tags. Fiducial tags come in various forms, such as quick response (QR) codes, barcodes, specialized marker patterns like April Tags, etc.

A process for fiducial tag-based state estimation involves (1) detection, (2) recognition, (3) pose estimation, and (4) iteration. With respect to the first step of detection, the process includes capturing images, via a camera of the mobile robot, of the environment and performing image processing techniques (e.g., thresholding, edge detection, etc.) to identify the fiducial tags present in the scene. With respect to the second step of recognition, the process includes matching the detected fiducial tags against a known library of tag patterns to identify their unique IDs. With respect to the third step of pose estimation, the process includes using the known properties of the fiducial tags, such as their size and shape, along the detected image coordinates. A program calculates the pose (i.e., position and orientation) of each tag relative to the camera. With respect to the iteration step, this process is repeated over time as new images are captured, allowing for continuous updating of the robot's state estimation based on the detection and recognition of fiducial tags in the scene.

The visual input modality is used besides wheel odometry because, with skid-steer configuration, the robot turning rate is a function of both wheel velocities and skidding rate. As wheel odometry does not consider skidding, the corresponding state estimates are inaccurate. Thus, the fiducial tag-based modality may provide better state estimates that may be used in planning and control.

The IMU module 120 is configured to generate state estimation data using inertial measurement units. The IMU module 120 is configured to generate a position estimate using IMU data from one or more IMU sensors, which may include an accelerometer, a gyroscope, a magnetometer, etc.

The wheel encoder module 122 is configured to generate state estimation data using information obtained from wheels of the mobile robot. For instance, in an example, the mobile robot may comprise a four wheeled skid-steer configuration robot. The wheel encoders therefore comprise rotary encoders, which track motor shaft rotation to generate position and motion information based on wheel movement. The wheel encoder module 122 is therefore configured to generate state estimation data from wheel encoders and/or wheel odometry.

Also, as shown in FIG. 1, the perception module 104 includes the mapping module 112 and the prediction module 114. The mapping module 112 is configured to perform mapping actions relating to one or more sensors. For example, the mapping module 112 is configured to generate a map or perform mapping with respect to visual input, LIDAR, RADAR, etc. The prediction module 114 is configured to generate prediction data. As an example, the prediction data may relate to at least one other vehicle's trajectory forecasting and/or at least one other robot's trajectory forecasting. The mapping module 112 and the prediction module 114 are advantageous in ensuring that the system 100 is configured to navigate around its surroundings in an efficient and reliable manner without collision (e.g., colliding with another vehicle or robot).

As aforementioned, the perception module 104 is configured to generate perception data. The perception data includes state data (e.g. position estimate), a set of confident zone maps, and a unified confident zone map, or any combination thereof. The state data includes a position estimate such as (x,y,θ), where x and y are cartesian position coordinates of the mobile robot and where θ is an orientation of the robot. Also, the perception module 104 includes known sensor models (i.e., mathematical models that describes the relation between the actual sensor output and the robot state in global frame) for all the sensor modalities. In addition, the perception module 104 is configured to transmit the perception data to the motion planner 106. The perception module 104 is also configured to transmit (i) the mapping data from the mapping module 112 and/or (ii) prediction data from the prediction module 114, to the motion planner 106.

The motion planner 106 is configured to receive perception data from the perception module 104 and environment data from the environment module 102. The motion planner 106 is also configured to receive mapping data from the mapping module 112 and prediction data from the prediction module 114. The motion planner 106 is configured to generate motion planning data using the perception data and the environment data. The motion planning data includes a nominal path for the mobile robot. The motion planning data includes control commands for the mobile robot. The control commands include a plan for the mobile robot. The control commands specify a linear velocity of the mobile robot and an angular velocity of the mobile robot. The motion planner 106 is configured to transmit the motion planning data to the control system 108.

The control system 108 is configured to receive motion planning data from the motion planner 106. For example, the motion planning data includes a nominal path for the control system 108 to control a movement of the mobile robot. In response to receiving the motion planning data, the control system 108 is configured to transmit a control signal and/or perform an action that advances the mobile robot according to the nominal path. In addition, the control system 108 is configured to update the environment module 102.

Figure 2:
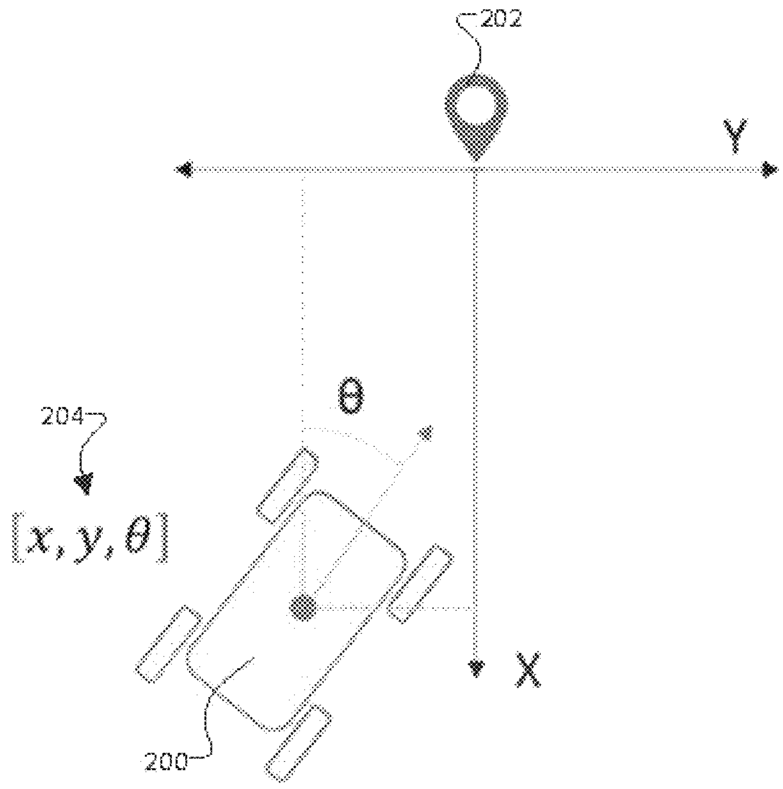
FIG. 2 is a diagram of an example of a state of a mobile robot according to an example embodiment of this disclosure.

FIG. 2 is a diagram that represents a state of the mobile robot 200 according to an example embodiment. In this example, the mobile robot 200 performs state estimation and generates state data 204, which is represented by (x,y,θ), where x and y are cartesian position coordinates of the mobile robot 200 and where θ is an orientation of the mobile robot 200. In this case, x, y, and θ are relative to some reference location 202 (e.g., a target location, a goal, etc.). As an example, the reference location 202 refers to a location of a docking station of the mobile robot 200. In this regard, FIG. 2 illustrates the mobile robot 200 in relation to these parameters.

Precise navigation requires accurate and robust state estimation, coupled with effective path-planning and control strategies. The system 100 (e.g., the motion planner 106) receives the state data 204, represented as (x,y,θ), as input data and is configured to generate control commands, represented as (v,w), as output data. With respect to the output data, v represents linear velocity and w represents angular velocity.

More specifically, as an example, the mobile robot 200 may be a rover, which performs smart-docking maneuvers on the surface of the moon. In this case, the rover is initialized with a rough state estimate, some distance, D, away from a stationary charging coil. The rover is configured to autonomously perform precise navigation to and docking with the charging coil, despite the possible existence of negative environmental factors (e.g., low-light conditions, high glare/reflectivity on the fiducial marker, lunar dust obscuring part of the rover's camera lens, etc.).

Also, the mobile robot 200 may be a four wheeled skid-steer configuration robot. The mobile robot includes sensors, such as wheel encoders and RGB cameras and, thus, the system 100 is configured to consider wheel odometry and information from visual fiducial tag, placed at the goal location, for state estimation or noisy state estimation. In addition, a 'cone of interest,' may refer to the space from where mobile robot 200 senses the tag and estimates state data therefrom.

Figure 3:
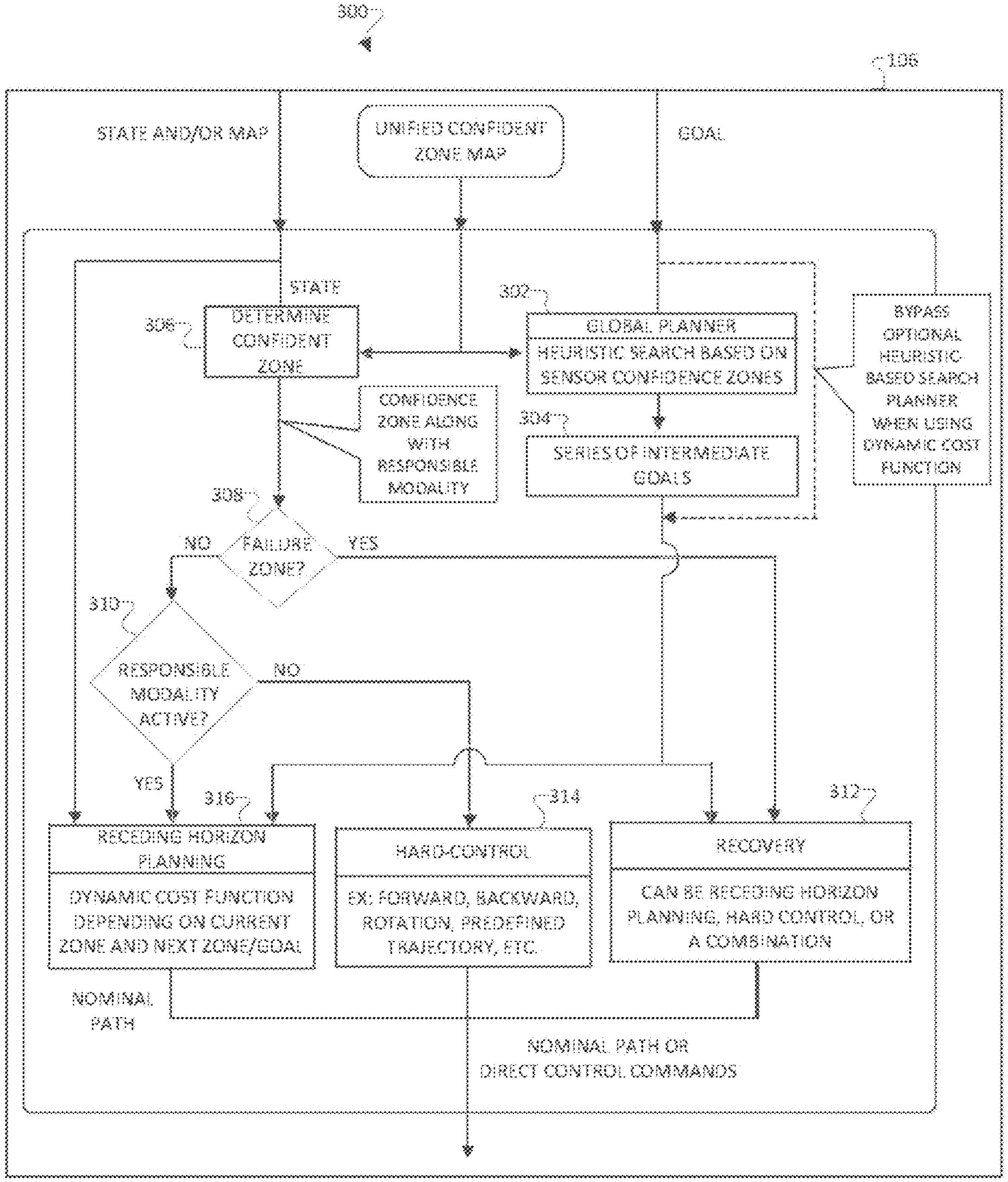
FIG. 3 is a flow diagram of an example of a planning pipeline for a motion planner according to an example embodiment of this disclosure.

FIG. 3 is a flow diagram of an example of a process 300 of the motion planner according to an example embodiment. The process 300 is shown as a planning pipeline, which includes a global planner and a zone-based planner. The global planner is configured to implement a heuristic search based on sensor confidence zone and generate a set of intermediate locations ("set of intermediate goals") between a current location and a target location (e.g., "goal," reference location, docking/charging station location, etc.). In addition, as an overview, the pseudocode for the zone planner is set forth in TABLE 2. The zone planner is configured to execute zone-based planning with recovery mode. In the pseudo code, the "map" refers to an occupancy grid or a traversability map. These planning strategies, as provided in FIG. 3 and TABLE 1, become more robust and reliable in real-world scenarios given the dynamic of the mobile robot and the sensor uncertainties.

TABLE 1

Algorithm: Zone-based Planning with Recovery Mode

```
function RUNPLANNER (state, map, goal)
  zone, responsible_modality = get_sensor_confidant_zone(state)

  if zone is not failure_zone then
    if response_modality is True then
      f = shape_cost_function(zone)
      control = run_receding_control(state, map, goal, f)
    else
      control = hard_control( )
    end if
  else
    control = recovery_model( )
  end if
  return control
end function
```

Referring to FIG. 3, the motion planner 106 is configured to receive perception data from the perception module 104 and environmental data from the environment module 102. In this example, the motion planner 106 is configured to receive state data including a position estimate and a unified confident zone map from the perception module 104. The motion planner 106 may also receive a map and/or one or more confident zone maps from the perception module 104. In addition, the motion planner 106 is configured to receive at least a goal or a reference/target location from the environment module 102.

At step 302, according to an example, the process includes a global planner, which includes any heuristic-based search involving the unified confident zone map. The global planner receives the goal (e.g., target location) and the unified confident zone map as input and generates a series of intermediate goals (step 304) as output. The global planner is configured to generate a global plan from a current location (or position estimate) of the mobile robot 200 to the target location (e.g., goal, destination location, docking/charging station location, etc.). For example, the global plan includes performing a heuristic search based on sensor confidence zones. In this regard, the heuristic search may include identifying confidence zones with confidence levels of at least one predetermined confidence range for intermediate goals. In addition to confidence level, the heuristic search may also distance as a factor for identifying a set of intermediate goals between the source location and the target location.

Figure 4:
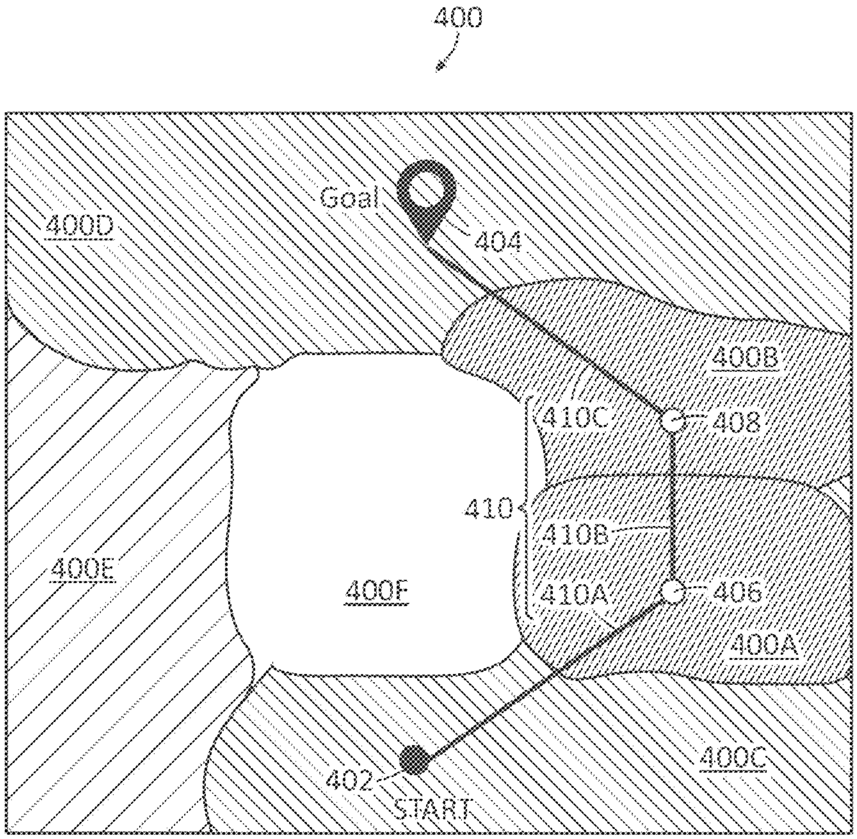
FIG. 4 is a diagram of a non-limiting example of heuristic search planning to obtain intermediate goal locations according to an example embodiment of this disclosure.
Figure 4:
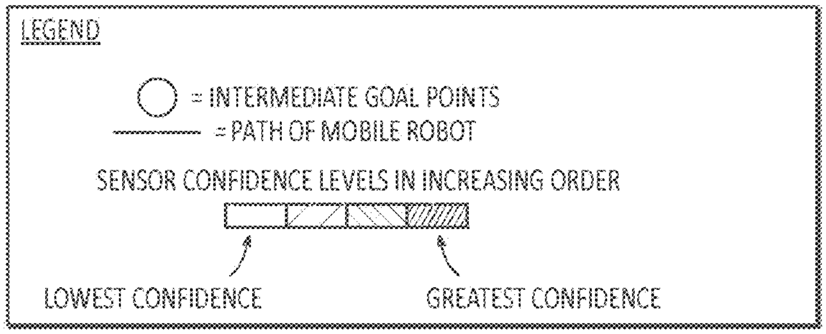

At step 304, according to an example, the process includes generating a set of intermediate goals or a series of intermediate goals via the heuristic-based search of step 302. The intermediate goals may refer to intermediate locations between a current location (or position estimate) of the mobile robot 200 and the target location (e.g., goal, destination location, docking/charging station location, etc.). FIG. 4 shows a non-limiting example of a set of intermediate goals. After the set of intermediate goals is generated, then the process proceeds to step 312 or step 316, as indicated in FIG. 3.

As shown in FIG. 3, the global planner and the heuristic-based search are used alongside the dynamic cost function-based receding horizon planning approaches. Using this family of methods, the intermediate goal points, such as that shown in FIG. 4, may be obtained by choosing sensor confidence levels as heuristic for search, then feeding them as goals to a dynamic cost function. Thus, the set of intermediate goals may be used to augment receding horizon planning performance.

Also, as shown in FIG. 3, in some cases, the process may include bypassing steps 302 and 304. The process may consider steps 302 and 304 to be optional depending upon the scenario and/or situation. For example, if the distance between a current location of the mobile robot 200 and the target location is relatively small, then the motion planner 106 may bypass steps 302 and 304 and may not generate a set of intermediate goals between these two locations.

At step 306, according to an example, the process includes obtaining a current confident zone using the state data and the unified confident zone map. The current confident zone refers to a confident zone of the unified confident zone map that corresponds to the state data.

In general, a confident zone refers to a spatial area that spans the locations where state estimates have the same uncertainty range in the values. There are a number of uncertainty ranges. A similar or same uncertainty range is categorized as a particular confidence level. Upon obtaining the current confident zone that corresponds to the state data, the process proceeds to step 308.

Figure 5:
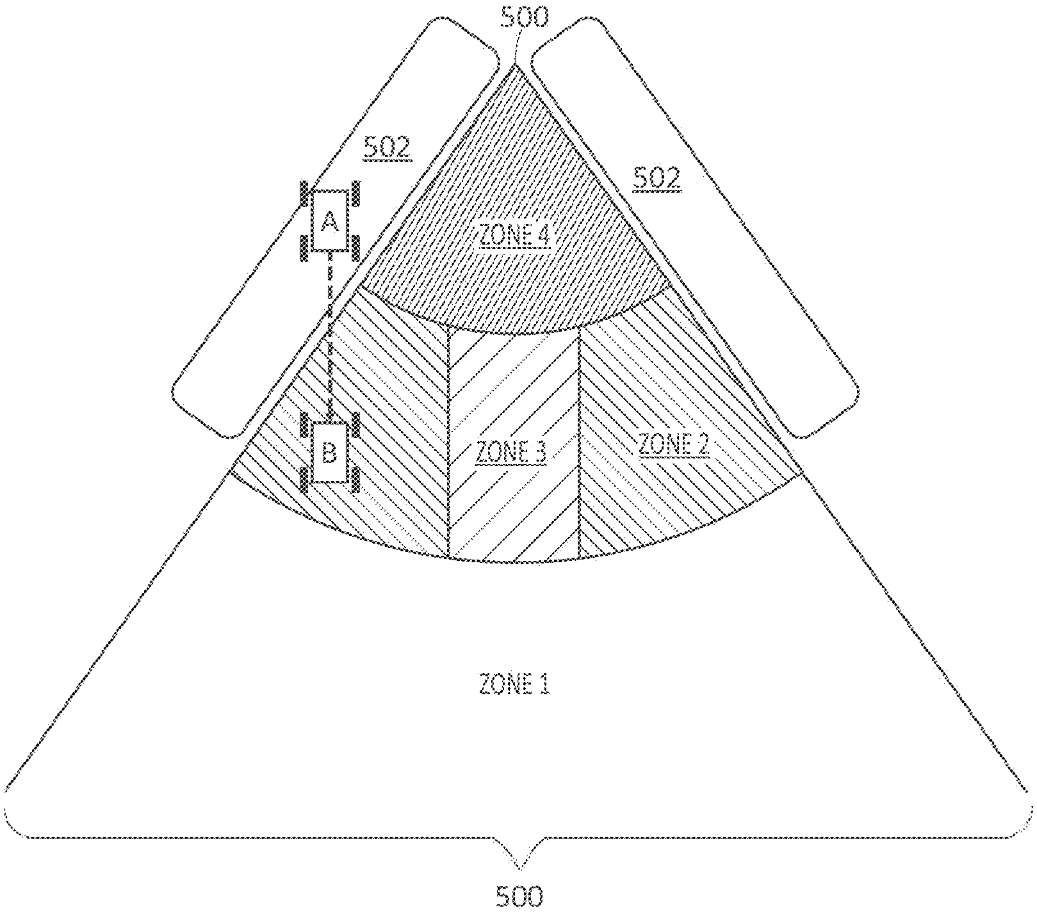
FIG. 5 is a diagram of a non-limiting example of a recovery scenario according to an example embodiment of this disclosure.
Figure 5:
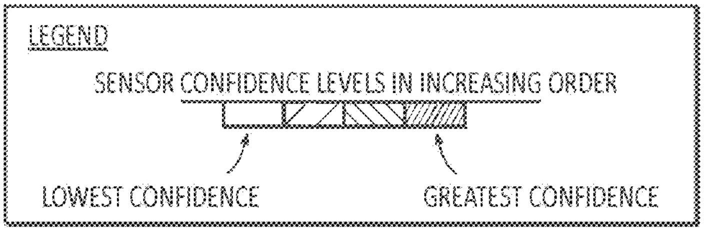

At step 308, according to an example, the process includes assessing whether or not the current confident zone is deemed a failure zone. The process includes generating assessment data indicative of whether or not the current confident zone is deemed a failure zone. If the assessment data indicates that the current confident zone is deemed a failure zone, then the process proceeds to step 312 to generate a recovery plan. In this regard, even though the strategies are robust, there may be instances in which the mobile robot 200 realizes later that the state data and/or unified confident zone map indicates that the mobile robot 200 is located in a highly uncertain sensing zone, or in the wrong state, by not following an optimal path. For instance, the scenarios may occur (i) when the robot misaligns with the charging coil at the goal state, thereby resulting in ineffective charging; and/or (ii) when the mobile robot 200 detects early failure zones, such as zones from where the mobile robot 200 cannot make it to desired final pose irrespective of the planning efforts, as illustrated in FIG. 5. Alternatively, if the assessment data indicates that the current confident zone is not deemed to be a failure zone (if the current confident zone is a non-failure/safe confident zone), then the process proceeds to step 316.

At step 310, according to an example, the process includes determining the responsible sensor modality for the current confident zone of the unified confident zone map and assessing whether or not the one or more sensors, which generated the state data (e.g. position estimate), is of the same sensor modality as the responsible sensor modality. The process may generate assessment data indicative of whether or not the responsible sensor modality is active with respect to the current confident zone. Upon determining that the responsible sensor modality, associated with the current confident zone, is active for the mobile robot at that state data, then the process proceeds to step 316. Alternatively, upon determining that the responsible sensor modality, associated with the current confident zone, is inactive for the mobile robot at that state data, then the process proceeds to step 314.

The responsible sensor modality is the best sensor modality that gives a greatest confidence level (e.g. less error and less uncertainty) and greatest reliability for a given location. Each confident zone is associated with a responsible sensor modality. As a non-limiting example, if a fiducial tag based sensor modality provides greater reliability and exhibits a greater confidence level than wheel odometry sensor modality for a given location, then the fiducial tag based modality is selected as the responsible sensor modality for that given location and its confidence level is selected to represent the confidence zone for that given location on the unified confident zone map. Also, if the mobile robot 200 generated state data via one or more sensors associated with fiducial tag based modality, then the responsible sensor modality is deemed active. Alternatively, if the state data was generated from one or more sensors associated with another sensor modality (e.g., wheel odometry) that did not include the fiducial tag based modality, then the response sensor modality is deemed inactive.

At step 312, according to an example, the process includes generating at least one control command that relates to a recovery plan or a recovery mode for the mobile robot 200. More specifically, the recovery plan and/or recovery mode moves the mobile robot 200 to a more confident space and then replans the mobile robot's next actions. Here, the recovery mode and/or the recovery plan may comprise a receding-horizon method, a hard control, or a combination of receding-horizon method and a hard control. By using this recovery mode feature, the motion planner 106 is configured to activate recovery when the mobile robot 200 is not at a final desired state. Moreover, with this recovery mode feature, the motion planner 106 also does early kick-in if a simulated future plan cannot land the mobile robot 200 in the desired state; thereby avoid unnecessary replanning efforts.

At step 314, according to an example, the process includes generating at least one control command that relates to hard control or performing a hard control. In general, a hard control includes any predefined motion. The predefined motion may include rotation, moving forward, moving backward, or a predefined trajectory.

With respect to step 314, sometimes, the obtained confidence spaces may not be active, for example, if the fiducial tag is not in the camera's view for a fiducial tag-based state estimation modality. In order to activate those spaces, the motion planner 106 makes use of hard control by suspending receding horizon control for some time. For instance, as a non-limiting example, the hard control may include a simple rotation around the mobile robot's vertical axis to find the fiducial tag. Once the fiducial tag comes into view, the confidence space gets activated. In this example, hard control is engaged only when the mobile robot 200 is in a confidence space, with the corresponding sensor modality responsible for that confidence is not active. In the example, consider a scenario with fiducial tag not in view and mobile robot's location (x, y) is determined using only wheel odometry. Also, at (x, y), if fiducial tag based sensor modality is more confident than wheel odometry sensor modality, then the hard control is engaged to make the fiducial modality active. The type of hard control, which is generated at step 314, depends on the robot configuration, speed limits, robot control frequency, etc.

At step 316, according to an example, the process includes generating at least one control command that relates to receding horizon planning via a dynamic cost function. As an example, the receding horizon planning includes a model-predictive type with path integral formulation. For instance, the receding horizon planning comprises model predictive path integral (MPPI), as set forth in TABLE 2. The motion planner 106 is configured to generate a nominal path for the mobile robot 200 to travel from a current location or current position estimate to the goal or an intermediate goal.

TABLE 2

| Algorithm: Model Predictive Path Integral | |
|---|---|
| 1 | Initialize a control sequence (can be zeros). Assume this as a nominal control sequence |
| 2 | Sample control sequences from a Gaussian distribution around the nominal sequence |
| 3 | Roll out the trajectories using control sequences and underlying robot kinematics to obtain state sequences |
| 4 | Compute the cost of each trajectory for chosen objective/cost function |
| 5 | Find the weight of each trajectory by performing a soft-min operatoin |
| 6 | Update the nominal control sequence by doing a weighted average over the sampled control sequences |
| 7 | Apply the first control and then shift the sequence by one step, then repeat from 2 |

As aforementioned, the receding horizon planning includes and uses a dynamic cost function. In this regard, the cost function weights or its formulation may change, depending on which underlying confident zone an agent (e.g., mobile robot) is presently in and what the next goal waypoint is; this allows the planner to dynamically replan, based on various conditions, in order to get more desirable motion characteristics (e.g., slowing down the robot for more precise navigation, or turning sharply to enter a higher-confidence region) which will give the agent a better chance of reaching the overall goal location successfully, as indicated in equation 1.

$$f(w_1, w_2) \to f(w_{1new}, w_{2new}) \text{ or } f(w_{1f}, w_{2f}) \to g(w_{1g}, w_{2g}) \quad [1]$$

In equation 1, w is a weight parameter for a cost function feature, for example $f=w_1*f_1$, where $f_1$ is distance-to-goal cost; $(w_1, w_2)$ and $(w_{1new}, w_{2new})$ are the old weights and the new weights of the cost function $f$, respectively; g is the new cost function i.e., $f$ changes to g with same or different weights.

FIG. 4 is a diagram of a non-limiting example of a visualization of heuristic search planning to obtain intermediate goal locations according to an example embodiment. The visualization shows a unified confident zone map 400 with a number of confident zones 400A-400F. For example, in this non-limiting example, the unified confident zone map 400 includes a first confident zone 400A, a second confident zone 400B, a third confident zone 400C, a fourth confident zone 400D, a fifth confident zone 400E, and a sixth confident zone 400F. These confidence zones comprise various confidence levels.

In addition, FIG. 4 shows a source location 402 and a target location 404. In this case, the source location 402 may be a current location of the mobile robot 200 or a start location of the mobile robot 200. The target location 404 is a goal location, a docking/charging station location, or any similar destination location. In this case, the mobile robot is currently positioned at the source location. As such, the motion planner 106 is configured to determine that the current confident zone is the third confident zone based on state data (e.g., position estimate) of the mobile robot.

FIG. 4 also illustrates the generation of a number of intermediate goals between the source location 402 and the target location 404. In this example, the set of intermediate goals include a first intermediate goal location 406 and a second intermediate goal location 408. As shown in FIG. 4, the set of intermediate goals are obtained by a heuristic search of confidence levels of the unified confident zone map. For example, the heuristic search includes locating a next confident zone that has a greater confidence level from among candidates of confident zones. In this case, the first intermediate goal location 406 is positioned in the first confident zone 400A and the second intermediate goal location 408 is positioned in the second confident zone 400B to avoid moving the mobile robot 200 to the sixth confident zone 400F, which has a lowest confidence level. Once an intermediate goal has been generated, the motion planner 106 is configured to generate a path from the source location 402 to the target location 404. In this case, the path 410 includes (i) a first path segment 410A from the source location 402 to the first intermediate goal location 406, (ii) a second path segment 410B from the first intermediate goal location 406 to the second intermediate goal location 408, and (iii) a third path segment 410C from the second intermediate goal location 408 to the target location 404 (e.g., the goal"). In this regard, as shown in FIG. 4, the motion planner 106 provides the mobile robot 200 with a plan to traverse through the confidence zones with the more confident levels by using dynamic cost function and optionally placing the intermediate goal points in those confident zones with the more confident levels.

FIG. 5 is a diagram of a visualization of a non-limiting example of a scenario that includes a recovery plan or a recovery mode according to an example embodiment. The visualization shows (i) a unified confident zone map 500 and (ii) failure zones 502. The unified confident zone map 500 includes a number of confident zones, such as zone 1, zone 2, zone 3, and zone 4. The confident zones have different confidence levels. These zones (e.g., zone 1, zone 2, zone 3, and zone 4) are provided in the cone of interest. Meanwhile, the visualization also shows a number of failure zones 502, which are located outside the cone of interest. For example, the failure zone 502 may refer to a highly uncertain sensing zone. The failure zone 502 may refer to an area in which the mobile robot misaligns with the charging coil at the goal, thereby resulting in ineffective charging. The failure zone 502 may be an area from where the mobile robot 200 cannot make it to the desired final pose irrespective of the planning efforts.

As shown in FIG. 5, in this visualization and scenario, the mobile robot 200 is labeled with an "A" to show an instance in which the mobile robot 200 accidently lands in the failure zone. Upon determining that the mobile robot 200 is in the failure zone, the motion planner 106 is configured to generate a control command that relates to a recovery plan and/or a recovery mode. In this non-limiting example, the recovery plan and/or the recovery mode includes moving the mobile robot 200 out of the failure zone and to a non-failure zone. In this case, as shown in FIG. 5, the recovery plan includes returning the mobile robot 200 to a sensor confident zone via a hard control. The mobile robot 200 is labeled with a "B" to show an instance in which the mobile robot 200 moves to zone 2 so that the mobile robot 200 is configured to replan and advance towards its goal or target location.

Figure 6:
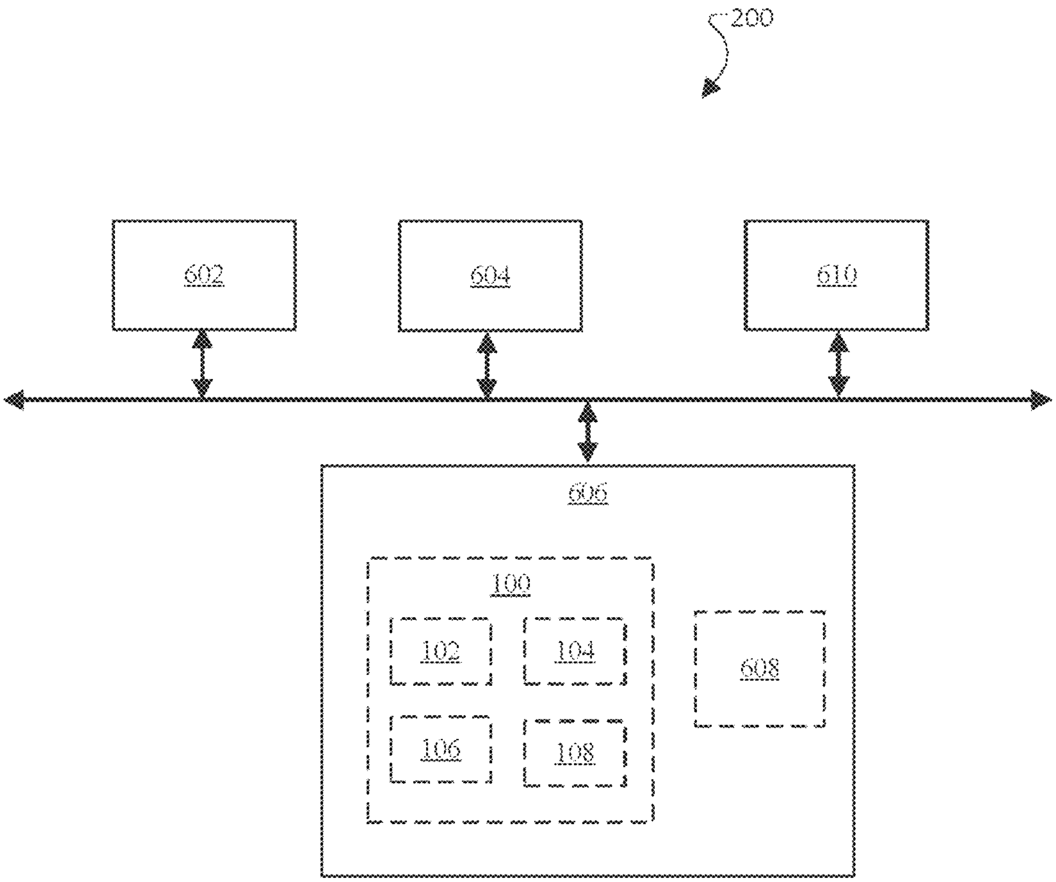
FIG. 6 is a block diagram that illustrates an example of a mobile robot according to an example embodiment of this disclosure.

FIG. 6 is a block diagram of an example of the mobile robot 200 according to an example embodiment. More specifically, the mobile robot 200 includes at least a processing system 602 with at least one processing device. For example, the processing system 602 includes at least an electronic processor, a central processing unit (CPU), a graphics processing unit (GPU), a Tensor Processing Unit (TPU), a microprocessor, a field-programmable gate array (FPGA), an application-specific integrated circuit (ASIC), any suitable processing technology, or any number and combination thereof. The processing system 602 is operable to provide the functionality as described herein.

The mobile robot 200 is configured to include at least one sensor system 604. The sensor system 604 senses the environment and generates sensor data based thereupon. The sensor system 604 is in data communication with the processing system 602. The sensor system 604 is also directly or indirectly in data communication with the memory system 606. The sensor system 604 includes a number of sensors. As aforementioned, the sensor system 604 includes various sensors of various sensor modalities. For example, the sensor system 604 includes at least an image sensor (e.g., a camera), a wireless sensor (e.g., Wi-Fi 2.4 GHz on an ESP32 wireless chip), IMU technology (e.g., accelerometer, a gyroscope, a magnetometer, etc.), a light detection and ranging (LIDAR) sensor, a radar sensor, wheel encoders, a motion capture system, any applicable sensor, or any number and combination thereof. Also, the sensor system 604 may include a thermal sensor, an ultrasonic sensor, an infrared sensor, a motion sensor, or any number and combination thereof. The sensor system 604 may include a satellite-based radio navigation sensor (e.g., GPS sensor). In this regard, the sensor system 604 includes a set of sensors that enable the mobile robot 200 to sense its environment and use that sensing information to operate effectively in its environment.

The mobile robot 200 includes a memory system 606, which is in data communication with the processing system 602. In an example embodiment, the memory system 606 includes at least one non-transitory computer readable storage medium, which is configured to store and provide access to various data to enable at least the processing system 602 to perform the operations and functionality, as disclosed herein. The memory system 606 comprises a single memory device or a plurality of memory devices. The memory system 606 may include electrical, electronic, magnetic, optical, semiconductor, electromagnetic, or any suitable storage technology that is operable with the mobile robot 200. For instance, the memory system 606 includes random access memory (RAM), read only memory (ROM), flash memory, a disk drive, a memory card, an optical storage device, a magnetic storage device, a memory module, any suitable type of memory device, or any number and combination thereof.

The memory system 606 includes at least the system 100, which includes at least the environment module 102, the perception module 104, the motion planner 106, and the control system 108. In addition, the memory system 606 includes other relevant data 608. The system 100 and the other relevant data 608 are stored on the memory system 606. The system 100 includes computer readable data. The computer readable data includes instructions. In addition, the computer readable data may include various code, various routines, various related data, any software technology, or any number and combination thereof. The instructions, which, when executed by the processing system 602, is configured to perform at least the functions described in this disclosure. Meanwhile, the other relevant data 608 provides various data (e.g., operating system, etc.), which relate to one or more components of the mobile robot 200 and enables the mobile robot 200 to perform the functions as discussed herein.

In addition, the mobile robot 200 includes other functional modules 610. For example, the other functional modules 610 include a power source (e.g., one or more batteries, etc.). The power source may be chargeable by a power supply of a docking station. The other functional modules 610 include communication technology (e.g., wired communication technology, wireless communication technology, or a combination thereof) that enables components of the mobile robot 200 to communicate with each other, communicate with one or more other communication/computer devices, or any number and combination thereof. The other functional modules 610 may include one or more I/O devices (e.g., display device, speaker device, etc.).

Also, the other functional modules 610 may include any relevant hardware, software, or combination thereof that assist with or contribute to the functioning of the mobile robot 200. For example, the other functional modules 610 include a set of actuators, as well as related actuation systems. The set of actuators include one or more actuators, which relate to enabling the mobile robot 200 to perform one or more of the actions and functions as described herein. For example, the set of actuators may include one or more actuators, which relate to driving wheels of the mobile robot 200 so that the mobile robot 200 is configured to move around its environment. The set of actuators may include one or more actuators, which relate steering the mobile robot 200. The set of actuators may include one or more actuators, which relate to a braking system that stops a movement of the wheels of the mobile robot 200. Also, the set of actuators may include one or more actuators, which relate to other actions and/or functions of the mobile robot 200. In general, the other functional modules 610 include various components of the mobile robot 200 that enable the mobile robot 200 to move around its environment, and optionally perform one or more tasks in its environment.

As described in this disclosure, the system 100 provides several advantages and benefits. For example, the system 100 includes optimal control strategies that account for various inaccuracies in sensor measurements due to noise, biases, calibration errors, or limitations in the sensing capabilities. In addition, the system 100 is configured to make decisions based on this imperfect sensor information.

In order to make planning strategies practically robust under sensor uncertainties and enable a mobile robot 200 to navigate safely and effectively, the system 100 includes optimal control strategies that include zone-based planning schemes with recovery mode. Here, the motion planner 106 is a combination of a receding horizon planning method and hard-control. The motion planner 106 is configured to make the mobile robot 200 traverse through perception spaces of high confidence. The system 100 is configured to understand the strengths and weaknesses of each sensor modality and obtain sensor confident zones. Once these confident zones are mapped, the motion planner 106 is configured to use a dynamic cost function to generate trajectory plans to execute. The weights of the planner cost function change to go through confident spaces in order to reach the goal, thereby the state estimates are accurate along the path.

Furthermore, although this disclosure included an example use-case of a rover that performs smart-docking maneuvers on the surface of the moon, the system 100 is applicable to various real-world applications and may be used in various settings. For example, the system 100 may also be used in settings where satellite-based navigation systems, e.g., GPS, is unreliable or unavailable, such as in a warehouse, a home, a commercial space, a garage, etc.

Also, the system 100 uses a combination of receding horizon control and hard control for planning. Upon obtaining the unified confident zone map, the motion planner 106 is configured to traverse through the more sensor confident spaces via a dynamic cost function and optionally place intermediate goal points in those spaces, as shown in FIG. 4. In this regard, the motion planner 106 is configured to suggest and plan routes for the mobile robot 200 that comprise more certain and more confident spaces for sensing, for example, when the mobile robot 200 is in an uncertain zone.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method for controlling a mobile robot, the computer-implemented method comprising:

receiving sensor data from one or more sensors of the mobile robot, the mobile robot including a plurality of sensors and a plurality of distinct sensor modalities associated with estimating a position of the mobile robot:

generating state data using the sensor data, the state data including a position estimate of the mobile robot with respect to a target location;

identifying a current confident zone on a unified confident zone map using the state data, the unified confident zone map including a plurality of confident zones, each confident zone being indicative of a given confidence level of given state data of a selected sensor modality for a given location, the selected sensor modality providing a greatest confidence level from among the plurality of sensor modalities for the given location;

generating assessment data indicating whether or not the current confident zone is deemed a failure zone using predetermined criteria;

generating a control command using the unified confident zone map; and controlling the mobile robot based on the control command, wherein, the control command relates to a recovery plan of moving the mobile robot out of the current confident zone and to another confident zone with another confidence level when the assessment data indicates that the current confident zone is the failure zone, the another confidence level being greater than a current confidence level of the current confidence zone; and the control command relates to another plan when the assessment data indicates that the current confident zone is not the failure zone.

2. The computer-implemented method of claim 1, further comprising:

determining whether the one or more sensors belong to the selected sensor modality, wherein, the another plan includes advancing the mobile robot along a nominal path from the position estimate to the target location when the one or more sensors belong to the selected sensor modality; and the another plan includes performing a hard control of the mobile robot when the one or more sensors do not belong to the selected sensor modality.

3. The computer-implemented method of claim 2, further comprising:

generating the nominal path via a dynamic cost function.

4. The computer-implemented method of claim 2, wherein:

the hard control includes a predetermined motion to move the mobile robot such that at least one other sensor of the mobile robot is activated, the at least one other sensor being of the selected sensor modality;

the predetermined motion includes moving in a predetermined direction; and the predetermined direction includes a rotational direction, a forward direction, a backward direction, a left direction, or a right direction.

5. The computer-implemented method of claim 2, further comprising:

generating one or more intermediate locations between the position estimate and the target location, wherein the nominal path includes the one or more intermediate locations.

6. The computer-implemented method of claim 5, wherein the one or more intermediate locations are determined by choosing confidence levels of confidence zones as heuristic for search.

7. The computer-implemented method of claim 1, wherein the one or more sensors belong to a fiducial tag-based sensor modality.

8. The computer-implemented method of claim 1, wherein the predetermined criteria includes (1) being outside of a set of confident zones, or (ii) being below a predetermined range of confidence levels.

9. The computer-implemented method of claim 1, wherein the plurality of distinct sensor modalities include a wireless modality, a visual input modality, an inertial measurement unit (IMU) modality, and a wheel encoder modality.

10. A system comprising:

one or more processors; and one or more memory in data communication with the one or more processors, the one or more memory having computer readable data stored thereon, the computer readable data including instructions that, when executed by the one or more processors, cause the one or more processors to perform a method for controlling a mobile robot, the method includes receiving sensor data from one or more sensors of the mobile robot, the mobile robot including a plurality of sensors and a plurality of distinct sensor modalities associated with estimating a position of the mobile robot;

generating state data using the sensor data, the state data including a position estimate of the mobile robot with respect to a target location;

identifying a current confident zone on a unified confident zone map using the state data, the unified confident zone map including a plurality of confident zones, each confident zone being indicative of a given confidence level of given state data of a selected sensor modality for a given location, the selected sensor modality providing a greatest confidence level from among the plurality of sensor modalities for the given location;

generating assessment data indicating whether or not the current confident zone is deemed a failure zone using predetermined criteria;

generating a control command using the unified confident zone map; and controlling the mobile robot based on the control command, wherein, the control command relates to a recovery plan of moving the mobile robot out of the current confident zone and to another confident zone with another confidence level when the assessment data indicates that the current confident zone is the failure zone, the another confidence level being greater than a current confidence level of the current confidence zone; and the control command relates to another plan when the assessment data indicates that the current confident zone is not the failure zone.

11. The system of claim 10, wherein the method further comprises:

determining whether the one or more sensors belong to the selected sensor modality, wherein, the another plan includes advancing the mobile robot along a nominal path from the position estimate to the target location when the one or more sensors belong to the selected sensor modality; and the another plan includes performing a hard control of the mobile robot when the one or more sensors do not belong to the selected sensor modality.

12. The system of claim 11, wherein the method further comprises generating the nominal path via a dynamic cost function.

13. The system of claim 11, wherein:

the hard control includes a predetermined motion to move the mobile robot such that at least one other sensor of the mobile robot is activated, the at least one other sensor being of the selected sensor modality;

the predetermined motion includes moving in a predetermined direction; and the predetermined direction includes a rotational direction, a forward direction, a backward direction, a left direction, or a right direction.

14. The system of claim 11, wherein the method further comprises:

generating one or more intermediate locations between the position estimate and the target location, wherein the nominal path includes the one or more intermediate locations.

15. The system of claim 14, wherein the one or more intermediate locations are determined by choosing confidence levels of confidence zones as heuristic for search.

16. The system of claim 10, wherein the one or more sensors belong to a fiducial tag-based sensor modality.

17. The system of claim 10, wherein the predetermined criteria includes (i) being outside of a set of confident zones, or (ii) being below a predetermined range of confidence levels.

18. One or more non-transitory computer-readable media that store instructions that, when executed by one or more processors, cause the one or more processors to perform a method for controlling a mobile robot in an environment, the method comprising:

receiving sensor data from one or more sensors of the mobile robot, the mobile robot including a plurality of sensors and a plurality of distinct sensor modalities associated with estimating a position of the mobile robot;

generating state data using the sensor data, the state data including a position estimate of the mobile robot with respect to a target location;

identifying a current confident zone on a unified confident zone map using the state data, the unified confident zone map including a plurality of confident zones, each confident zone being indicative of a given confidence level of given state data of a selected sensor modality for a given location the selected sensor modality providing a greatest confidence level from among the plurality of sensor modalities for the given location;

generating assessment data indicating whether or not the current confident zone is deemed a failure zone using predetermined criteria;

generating a control command using the unified confident zone map; and controlling the mobile robot based on the control command, wherein, the control command relates to a recovery plan of moving the mobile robot out of the current confident zone and to another confident zone with another confidence level when the assessment data indicates that the current confident zone is the failure zone, the another confidence level being greater than a current confidence level of the current confidence zone; and the control command relates to another plan when the assessment data indicates that the current confident zone is not the failure zone.

19. The one or more non-transitory computer-readable media of claim 18, wherein the method further comprises:

determining whether the one or more sensors belong to the selected sensor modality, wherein, the another plan includes advancing the mobile robot along a nominal path from the position estimate to the target location when the one or more sensors belong to the selected sensor modality; and the another plan includes performing a hard control of the mobile robot when the one or more sensors do not belong to the selected sensor modality.

20. The one or more non-transitory computer-readable media of claim 18, wherein the predetermined criteria include (i) being outside of a set of confident zones, or (ii) being below a predetermined range of confidence levels.

* * * * *